(12) United States Patent
Aronkytö et al.

(10) Patent No.: US 12,123,989 B2
(45) Date of Patent: Oct. 22, 2024

(54) METHOD FOR DETERMINING A BACKGROUND COUNT RATE IN LIQUID SCINTILLATION COUNTING

(71) Applicant: Hidex Oy, Turku (FI)

(72) Inventors: Petri Aronkytö, Raisio (FI); Eveliina Arponen, Turku (FI); Ville Haaslahti, Turku (FI); Risto Juvonen, Säkylä (FI); Timo Oikari, Turku (FI)

(73) Assignee: Hidex Oy, Turku (FI)

( * ) Notice: Subject to any disclaimer, the term of this patent is extended or adjusted under 35 U.S.C. 154(b) by 101 days.

(21) Appl. No.: 17/696,438

(22) Filed: Mar. 16, 2022

(65) Prior Publication Data

US 2022/0326401 A1    Oct. 13, 2022

(30) Foreign Application Priority Data

Apr. 9, 2021   (EP) .................................. 21167586.3

(51) Int. Cl.
*G01T 1/204*   (2006.01)
*G01T 1/20*    (2006.01)

(52) U.S. Cl.
CPC .......... *G01T 1/2018* (2013.01); *G01T 1/2042* (2013.01)

(58) Field of Classification Search
CPC ..... G01T 1/204; G01T 1/2042; G01T 1/2045; G01T 1/2047
See application file for complete search history.

(56) References Cited

PUBLICATIONS

Barnett et al. The measurement of 222Rn in drinking water by low-level liquid scintillation counting, Journal of Radioanalytical and Nuclear Chemistry vol. 161, No. 2, pp. 357-364 (Year: 1992).*

Thomson Liquid Scintillation Application Note, 6 pages with 6 pages of Liquid Scintillation Counting Application Note LSC-007 (Year : 2014).*

Lecompte et al. Tritium analysis in urine by the triple-to-double coincidence ratio method with the HIDEX 300 SL liquid scintillation counter, Radiation Protection Dosimetry vol. 188, No. 2, pp. 148-161 (Year: 2019).*

Extended European Search Report dated Oct. 6, 2021 in EP Application No. 21167586.3, 4 pages.

Gudelis, A. et al., "Measurements of some radionuclides using a new TDCR system and an ultra low-level conventional LSC counter in CPST, Lithuania", Applied Radiation and Isotopes, vol. 70, No. 9, Mar. 2, 2012, pp. 2204-2208.

Van Wyngaardt, W.M. et al., "A simple counting technique for measuring mixtures of two pure @b-emitting radionuclides", Nuclear Instruments & Methods in Physics Research, Section A, Elsevier BV, North-Holland, NL, vol. 564, No. 1, Aug. 1, 2006, pp. 339-346.

* cited by examiner

*Primary Examiner* — David P Porta
*Assistant Examiner* — Shun Lee
(74) *Attorney, Agent, or Firm* — Meunier Carlin & Curfman LLC

(57) ABSTRACT

The present invention provides a method for determining a background count rate in liquid scintillation counting. The method comprises measuring external standard spectra of a sample, determining, from the external standard spectra, a triple to double coincidence ratio and a quench parameter, determining, based on the triple to double coincidence ratio and the quench parameter, a background reference parameter, and determining, based on the background reference parameter, the background count rate from a background reference curve.

10 Claims, 2 Drawing Sheets

METHOD FOR DETERMINING A BACKGROUND COUNT RATE IN LIQUID SCINTILLATION COUNTING

PRIORITY

This application claims priority of European application number 21167586.3 filed on Apr. 9, 2021 and the contents of which is incorporated herein by reference.

TECHNICAL FIELD OF THE INVENTION

The present invention relates to a method for determining a background count rate in liquid scintillation counting according to the preamble of the appended independent claim.

BACKGROUND OF THE INVENTION

Liquid scintillation counting is a widely used technique to measure the radioactivity of a sample. The measurement technique is applicable to all forms of nuclear decay emissions, such as alpha and beta particles, electron capture and gamma ray emitting radionuclides. In liquid scintillation counting, the sample is placed in direct contact with a liquid scintillation medium to which the sample is dissolved or suspended. The liquid scintillation medium contains a mixture of chemicals that can absorb, for example, the energy of alpha or beta particles and convert the absorbed energy to light.

The emitted light is measured using one or more photodetectors. Registering light pulses during the time of measurement enables to represent the number of light pulses as a function their energy (pulse height). This energy spectrum is indicative of the amount of activity associated with the radionuclides in the measured sample. The frequency of light pulses (typically presented in counts per minute) corresponds to the absolute activity in the sample (decays per minute) that eventually corresponds to the number of radionuclides in the sample.

In liquid scintillation counting, the measurement of the sample consists of net counts obtained from actual radioactive decays and different sources of background. The background sources are, among other, thermal random coincidence pulses from photodetectors, random luminescence coincidence pulses and pulses generated by ambient radioactivity including gamma radiation from the surrounding material and cosmic radiation. Thermal background can be reduced by coincidence counting and by cooling the photodetectors. Lead shielding can be used to protect the sample and the photodetectors from ambient radioactivity.

FIG. 1 illustrates an example of a liquid scintillation counting system that employs a coincidence counting technique to reduce background. The system comprises a scintillation vial 101 for holding a radioactive cocktail and three symmetrically arranged photomultiplier tubes (PMTs) 102, 103 and 104 for detecting and amplifying the photons emitted from the radioactive cocktail and converting them into electrical pulses. The outputs of the PMTs 102, 103 and 104 are connected to a coincidence pulse detector 105, which compares the electrical signals received from the PMTs 102, 103 and 104. The coincidence pulse detector 105 can detect double coincidence pulses (i.e. simultaneous pulses from the PMTs 102 and 103, or 103 and 104, or 102 and 104) and triple coincidence pulses (i.e. simultaneous pulses from all the PMTs 102, 103 and 104). By only accepting coincidence pulses, the system can discriminate single pulses that are caused by thermal background and single photon noise, such as luminescence. The output of the coincidence pulse detector 105 is connected to a multichannel analyser (MCA) 106, which can produce energy spectra representing the amount and characteristics of the radioactivity in the sample.

In many liquid scintillation counting applications, it is necessary to be able to distinguish the net counts of the sample from the background. For this purpose, a specific background sample that is chemically like the (unknown) sample is prepared and measured. The measured counts from the background sample are subtracted from the gross counts of the sample to obtain the net counts of the sample. A problem associated with this technique is that the preparation of the background sample can be very difficult or even impossible, due to various chemical and/or technical reasons.

OBJECTIVES OF THE INVENTION

It is the main objective of the present invention to reduce or even eliminate the prior art problems presented above.

It is an objective of the present invention to provide a method for determining a background count rate in liquid scintillation counting. In more detail, it is an objective of the invention to provide a method for determining a background count rate without preparing and measuring a specific background sample that is chemically like the sample under measurement. It is also an objective of the present invention to provide a method for determining a background count rate in a quick and accurate manner.

In order to realise the above-mentioned objectives, the method according to the invention is characterised by what is presented in the characterising portion of the appended independent claim. Advantageous embodiments of the invention are described in the dependent claims.

DESCRIPTION OF THE INVENTION

A method according to the invention for determining a background count rate in liquid scintillation counting comprises measuring external standard spectra of a sample, determining, from the external standard spectra, a triple to double coincidence ratio and a quench parameter, determining, based on the triple to double coincidence ratio and the quench parameter, a background reference parameter, and determining, based on the background reference parameter, the background count rate from a background reference curve.

The method according to the invention enables to determine the background count rate for a sample without preparing and measuring a specific background sample that is chemically like the sample under measurement. In the method according to the invention, the background count rate is determined from the predefined background reference curve that represents the background count rate as a function of the background reference parameter. The background count rate is typically presented in counts per minute (CPM).

In the first step of the method according to the invention, external standard spectra of a sample are measured. The external standard spectra of the sample are measured with a liquid scintillation counting system that employs a coincidence counting technique. The system may comprise a scintillation vial for holding a radioactive cocktail and three symmetrically arranged photomultiplier tubes (PMTs) for detecting and amplifying the photons emitted from the radioactive cocktail and converting them into electrical pulses. The outputs of the PMTs are connected to a coincidence pulse detector, which compares the electrical signals received from the PMTs. The coincidence pulse detector can detect double coincidence pulses (i.e. simultaneous pulses from any of the two PMTs) and triple coincidence pulses (i.e. simultaneous pulses from all the PMTs). The output of the coincidence pulse detector is connected to a multichannel analyser (MCA), which can produce external standard spectra of the sample. The external standard spectrum of the sample is achieved by using an external gamma radiation source in the liquid scintillation counting system. The external standard spectrum represents an external standard count rate as a function of energy (pulse height). The external standard count rate is typically presented in counts per minute. The gamma radiation produces a wide spectrum of energies of Compton electrons via the Compton effect. The gamma radiation source can be, for example, Eu-152 isotope or Ba-133.

In the method according to the invention, the measured external standard spectra of the sample comprise at least an external standard spectrum that includes all (i.e. double and triple) coincidence counts measured from the sample, and an external standard spectrum that includes only the triple coincidence counts measured from the sample. In some applications, an external standard spectrum that includes only the double coincidence counts measured from the sample is used instead of the external standard spectrum that includes all the coincidence counts measured from the sample.

In the second step of the method according to the invention, a TDCR and a quench parameter are determined from the external standard spectra. The TDCR, i.e. triple to double coincidence ratio, is calculated by dividing the triple coincidence counts by the sum of the double and triple coincidence counts. The TDCR is preferably determined within a specific energy window. Preferably, a lower limit of the energy window is between 1 and 10 keV and an upper limit of the energy window is between 30 and 75 keV. The TDCR is directly proportional to a counting efficiency and thus it can be used to determine the absolute radioactivity of the sample without using other methods to determine counting efficiency like internal standard or quench parameter techniques.

In the third step of the method according to the invention, a background reference parameter is determined based on the TDCR and the quench parameter. The background reference parameter is determined by applying a function to the TDCR and the quench parameter.

In the fourth step of the method according to the invention, the background count rate is determined from a background reference curve based on the background reference parameter. This is achieved by finding the associated background count rate for the value of the background reference parameter from the curve.

The background reference curve is predefined by using a set of background samples with variable quench. This set can be made, for example, by using a pure liquid scintillation cocktail as a base and adding different amounts of a quench agent to obtain the background samples. For each background sample, the background reference parameter is determined as well as the actual count rate is measured. The background reference curve can be established by plotting all the datapoints to a count rate versus background reference parameter graph and by fitting a curve to these datapoints.

The method according to the invention can be applied in a liquid scintillation counting system to determine the background count rate for a sample. In the system, the sample is placed with a liquid scintillation medium in a scintillation vial. The liquid scintillation medium contains a mixture of chemicals that can absorb, for example, the energy of alpha or beta particles and convert the absorbed energy to light, which is measured using a setup comprising three symmetrically arranged photodetectors, such as photomultiplier tubes (PMTs). The registered light pulses during the time of measurement can be presented as an energy spectrum that is a plot representing the number or frequency of the light pulses as a function of their energy (pulse height). From this energy spectrum, a gross sample count rate within an energy window can be determined. The liquid scintillation counting system comprises an external gamma radiation source. By irradiating the scintillation vial with gamma radiation, external standard spectra of the sample can be measured. By using the method according to the invention, the background count rate can be determined from the external standard spectra of the sample. The net sample count rate can then be obtained by subtracting the background count rate from the gross sample count rate.

The background reference curve can be stored into a memory of the liquid scintillation counting system and used to determine the background count rate for different samples. The background reference curve can be updated if the energy window changes, the external standard changes, or the external standard activity has dropped due to decay of radioactivity, or other environmental reasons.

An advantage of the method according to the invention is that a background count rate can be determined without preparing and measuring a specific background sample that is chemically like the sample under measurement. Another advantage of the method according to the invention is that a background count rate can be determined in a quick and accurate manner.

According to an embodiment of the invention the background reference curve is generated by using a plurality of background samples having different quenches and performing the following steps for each background sample: measuring external standard spectra of the background sample, determining, from the external standard spectra, a triple to double coincidence ratio and a quench parameter, determining, based on the triple to double coincidence ratio and the quench parameter, a background reference parameter, measuring an energy spectrum of the background sample, and determining, from the energy spectrum, a background sample count rate within an energy window; plotting the background sample count rates against the background reference parameters, and fitting a curve to the datapoints to obtain the background reference curve.

The external standard spectrum of the background sample is achieved by using an external gamma radiation source in liquid scintillation counting. The external standard spectrum represents an external standard count rate as a function of energy (pulse height). The energy spectrum of the background sample is achieved without using an external gamma radiation source. The energy spectrum represents a background sample count rate as a function of energy (pulse height). In determining the TDCR, typically the same energy window is used like in the case of measuring the sample. The background reference parameter is determined by applying a function to the TDCR and the quench parameter.

According to an embodiment of the invention the background sample contains a liquid scintillation cocktail and a quench agent. The quench agent is used to vary quench and it can be, for example, nitromethane (chemical quench) or Sudan I (colour quench). Preferably, different background samples contain different amounts of quench agent.

According to an embodiment of the invention the number of background samples is at least 6. This enables to provide an enough accurate estimate of the background reference curve. The number of background samples can be, for example, 6-10, 10-20 or 20-50.

According to an embodiment of the invention the quench parameter is the spectral endpoint of the external standard spectrum.

According to an embodiment of the invention a lower limit of the energy window is between 1 and 10 keV and an upper limit of the energy window is between 30 and 75 keV.

According to an embodiment of the invention the background reference parameter is calculated by an equation:

$$Ref=TDCR\hat{\ }a*QP\hat{\ }b,$$

where TDCR is the triple to double coincidence ratio, QP is the quench parameter, and a and b are weight parameters. The weight parameters a and b are experimentally defined when the curve is established. This equation can be used for calculating the background reference parameters for the sample and the plurality of the background samples.

According to an embodiment of the invention the background reference parameter is calculated by an equation:

$$Ref=TDCR\hat{\ }a*QP\hat{\ }b*Ecounts\hat{\ }c,$$

where TDCR is the triple to double coincidence ratio, QP is the quench parameter, Ecounts is an external standard count rate within an energy window, and a, b and c are weight parameters. The weight parameters a, b and c are experimentally defined when the curve is established. This equation can be used for calculating the background reference parameters for the sample and the plurality of the background samples.

The present invention also relates to a method for determining a net sample count rate in liquid scintillation counting. The method comprises measuring an energy spectrum of a sample, determining, from the energy spectrum, a gross sample count rate within an energy window, determining a background count rate according to a method according to the invention, and subtracting the background count rate from the gross sample count rate to obtain the net sample count rate.

The determined net sample count rate includes an error due to chemical and colour quenching. Chemical quenching prevents the energy transfer from a decay particle to the scintillator and thus it reduces the initial photon output. Colour quenching prevents the generated photons from reaching the photodetector.

Different techniques are known to overcome quench issues. For example, there are different quench correction methods that are based on determination of the shift of the spectrum. The spectrum shift is relative to a change in a counting efficiency.

A plurality of standard samples with known radioactivity and variable quench can be used to generate a quench curve that can be used to determine a counting efficiency for the sample and hence to correct the measured raw counts to absolute radioactive decays in the sample. The quench curve can be generated in such a manner that for each standard sample a quench parameter is measured, and the efficiency is calculated by dividing the observed radioactivity with the known radioactivity. The quench curve can be established by plotting all the datapoints to the counting efficiency versus the quench parameter graph and by fitting a curve to these datapoints.

The counting efficiency for the sample is determined by first determining, from the external standard spectrum of the sample, a quench parameter, and then determining, based on the quench parameter, the counting efficiency from the quench curve. The absolute activity in the sample (decays per minute) that eventually corresponds to the number of radionuclides in the sample is determined by dividing the net sample count rate by the counting efficiency.

According to an embodiment of the invention the sample contains carbon-14. Carbon-14, or radiocarbon, is a radioactive isotope of carbon with an atomic nucleus containing 6 protons and 8 neutrons.

Example: Determination of Biological Content in Diesel Oil

Biological content in diesel oil can vary from 0% to 100%. Due to tax subsidiaries for bio-based products and regulatory reasons, it is important to be able to detect biological content in oil-based products, such as diesel oil. Chemical analysis (chro-matography, etc.) can identify molecular mixture in diesel but it cannot confirm whether the molecules are of biological origin. However, radiocarbon content in the sample will give net biological content of the carbon present. Cosmic radiation con-verts nitrogen atoms into radioactive carbon (C-14) in the upper atmosphere with constant flux. Radiocarbon bounds then to CO2 molecules, which are absorbed into plants in photosynthesis. This will give biological products a constant level of C-14 radioactivity that equals to about 13.5 DPM (decays per minute) in gram of total carbon. As half-life of C-14 is about 5700 years, there is no C-14 activity in fossil fuels since the radioactivity has decayed over the millions of years the oil has been captured underground. Thus, any oil-based sample has an internal fingerprint of biological content with C-14 activity. Zero DPM per gram of carbon equals with no biological origin while 13.5 DPM equals with 100% biological origin. And proportion-ally 1.35 DPM equals with 10% of biological origin.

Liquid scintillation counting is a practical method to count the radioactivity of C-14 in these samples. There are some challenges that the methodology needs to ad-dress though. One is the inherently low radioactivity of these types of samples. Basic methods to overcome the low radioactivity is to use sensitive instruments and long counting times to obtain statistically meaningful number of total counts. Counting times of around 6 hours per sample are commonly used. In addition, maximizing the sample size yields to higher sensitivity. As the measured radioactivity is between 0 and 13.5 DPM per gram of total carbon, it is beneficial to measure a large amount of the sample in order to obtain a high number of counts from the radioactive carbon.

In order to maximize the sample size, the preferred method is to mix the sample (diesel in this case) with a liquid scintillation cocktail directly. With e.g. 20 ml vial size, 50%-50% sample to cocktail ratio we can measure 10 ml of diesel in a single measurement. The amount of 10 ml of diesel weights 8 grams and has about 7 grams of total carbon (0.86 gC/gFUEL). With 7 grams of carbon the sample DPM would vary from 0 DPM to 95 DPM for fully fossil and fully biological diesel, respec-tively. With other sample preparation methods, the total carbon content will be lower. E.g. in oxidizing, a maximum of 1 gram of diesel could be treated that would yield 8 times lower counts, which would be difficult to count.

With direct counting there are two key challenges: highly variable quench and diffi-culty to make a blank background sample with exactly similar chemical composition with the unknown sample. Random diesel sample contains a mixture of oil molecules that vary from diesel brand to brand as well as different colours are added to diesel for process monitoring purposes that end up into the product. Variable quench (i.e. variable counting efficiency) can be managed using standard liquid scintillation counting quench correction methods. The background sample remains an issue, which can be solved with the present invention.

By utilising the method according to the invention, the biological content in diesel oil can be determined as follows:
1. Establish a background reference curve using a set of quenched background samples that do not contain C-14 radioactivity. The set can, for example, contain 10 background samples. This set can be made, for example, by using liquid scintillation cocktail and quench agents. Preferably, both chemical quenching agents and colour quenching agents are used. The background reference curve is established as follows:
   a. Process each background sample (A . . . J) as follows:
      i. Perform two measurements: one with external standard and one normal beta counting. For background sample A with external standard, record Quench Parameter (QP A) and TDCR (TDCR A). In normal counting mode, record observed counts that would then be background of measured sample (Bkg A).
      ii. Calculate background reference value (ref A) using QP A and TDCR A.
   b. Draw background reference curve by plotting each ref A . . . ref J against Bkg A . . . Bkg J.
2. For the unknown diesel sample (let's call it sample S)
   a. Perform two measurements: one with external standard and one normal beta counting. From the external standard spectrum, record QP S and TDCR S. Using normal beta counting measure sample (CPM) i.e. the C-14 counts from the sample.
   b. Calculate background reference value: ref S=f (TDCR S, QP S)
   c. Read background counts Bkg(CPM) from the background reference curve using ref S.
   d. Determine from the quench curve the counting efficiency c_eff using sample(QP)=QP S
3. Calculate net sample counts: net_sample(CPM) =sample(CPM)−Bkg(CPM)
4. Calculate absolute sample activity: Sample(DPM)=net_sample(CPM) c_eff
5. Calculate DPM per gram of carbon from the Sample (DPM) and determine how much biological origin there is in the sample.

The exemplary embodiments of the invention presented in this text are not inter-preted to pose limitations to the applicability of the appended claims. The verb "to comprise" is used in this text as an open limitation that does not exclude the exist-ence of also unrecited features. The features recited in the dependent claims are mutually freely combinable unless otherwise explicitly stated.

DETAILED DESCRIPTION OF THE DRAWINGS

Figure 1:
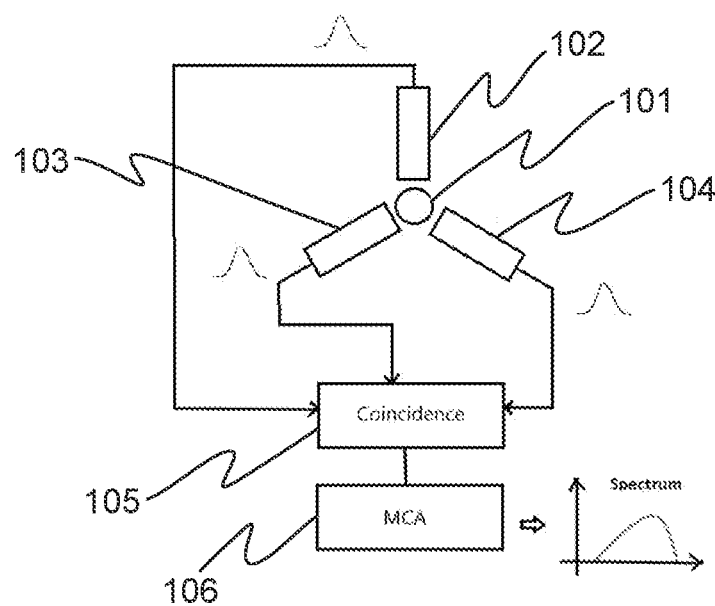
FIG. 1 illustrates an example of a liquid scintillation counting system that employs a coincidence counting technique.

FIG. 1 has already been described in connection with the background of the invention. Embodiments of the invention will now be described with reference to FIGS. 2 to 4.

Figure 2:
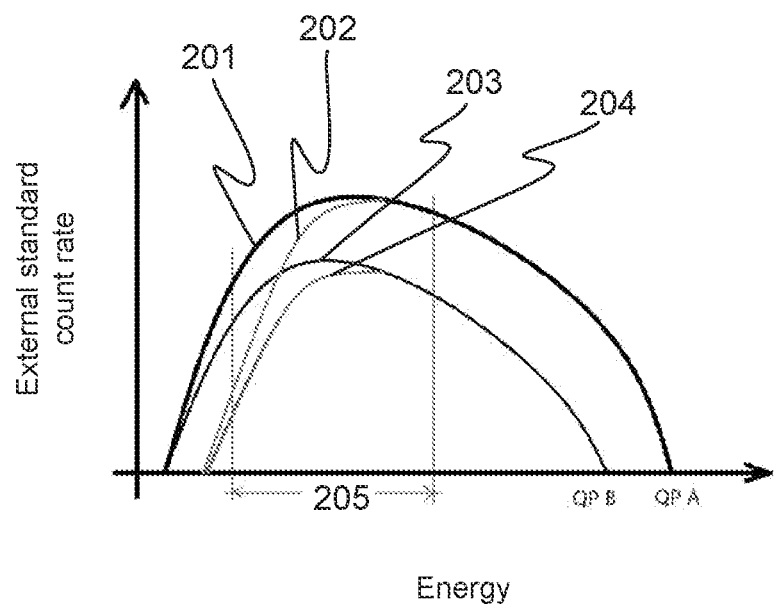
FIG. 2 illustrates examples of an external standard spectrum.

FIG. 2 illustrates examples of an external standard spectrum. The external standard spectrum represents an external standard count rate as a function of energy (pulse height). In FIG. 2, there are shown external standard spectra measured from two different samples, namely sample A and sample B. The external standard spectra have been measured with the liquid scintillation counting system of FIG. 1, which enables to detect double and triple coincidence pulses. The external standard spectra of the sample A are indicated with reference numbers 201 and 202. The external standard spectrum 201 includes all (i.e. double and triple) coincidence counts measured from the sample A, and the external standard spectrum 202 includes only the triple coincidence counts measured from the sample A. The external standard spectra of the sample B are indicated with reference numbers 203 and 204. The external standard spectrum 203 includes all (i.e. double and triple) coincidence counts measured from the sample B, and the external standard spectrum 204 includes only the triple coincidence counts measured from the sample B. The external standard spectra 201, 202, 203 and 204 were achieved by using an external gamma radiation source in the liquid scintillation counting system. The gamma radiation produced a wide spectrum of energies of Compton electrons via the Compton effect.

Based on the external standard spectra 201, 202, 203 and 204, TDCR values (TDCR A, TDCR B) within an energy window 205 can be calculated and quench parameters (QP A, QP B) can be determined. The quench parameters are the spectral endpoints of the external standard spectra 201 and 203. The TDCR value and the quench parameter are used in determining a background reference parameter that is then used to determine a background count rate for the sample from a background reference curve. The quench parameter can also be used in determining the counting efficiency for the sample from a quench curve.

Figure 3:
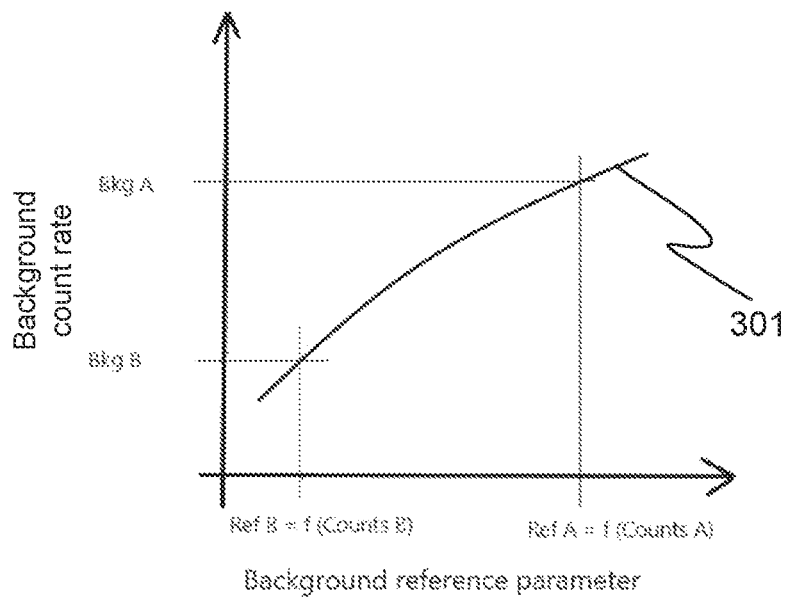
FIG. 3 illustrates an example of a background reference curve.

FIG. 3 illustrates an example of a background reference curve. The background reference curve 301 represents a background count rate as a function of a background reference parameter. The background reference curve 301 was created by using a set of blank background samples with variable quench. For each background sample, the background reference parameter was determined as well as the actual count rate was measured. The background reference curve 301 was established by plotting all the datapoints to the count rate versus the background reference parameter graph and by fitting a curve to these datapoints.

The background count rates for the samples A and B can be determined from the background reference curve 301 as follows. First, the background reference parameters (Ref A, Ref B) are calculated by using TDCR A and QP A for Ref A and TDCR B and QP B for Ref B. Then, the background count rates (Bkg A, Bkg B) are determined from the background reference curve 301 by finding the associated background count rates for the values of the background reference parameter.

Figure 4:
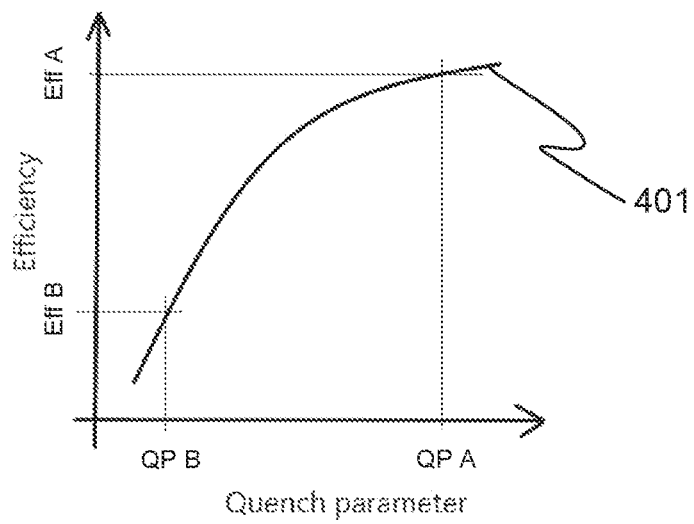
FIG. 4 illustrates an example of a quench curve.

FIG. 4 illustrates an example of a quench curve. The quench curve 401 represents a counting efficiency as a function of a quench parameter. The quench curve 401 was created by using a plurality of standard samples with known radioactivity and variable quench. For each standard sample, the quench parameter was measured, and the counting efficiency was calculated by dividing the observed radioactivity with the known radioactivity. The quench curve 401 was established by plotting all the datapoints to the counting efficiency versus the quench parameter graph and by fitting a curve to these datapoints. The quench curve 401 can be used to determine a counting efficiency for the samples A and B. The counting efficiency (Eff A, Eff B) for the samples A and B is determined from the quench curve 401, based on the quench parameters (QP A, QP B). The absolute activity in the samples A and B that eventually corresponds to the number of radionuclides can be determined by dividing the net sample count rate by the counting efficiency.

Only advantageous exemplary embodiments of the invention are described in the figures. It is clear to a person skilled in the art that the invention is not restricted only to the examples presented above, but the invention may vary within the limits of the claims presented hereafter. Some possible embodiments of the invention are described in the dependent claims, and they are not to be considered to restrict the scope of protection of the invention as such

The invention claimed is:

1. A method for determining a background count rate in liquid scintillation counting, wherein the method comprises:
    measuring external standard spectra of a sample using an external gamma radiation source;
    determining, from the external standard spectra, a triple to double coincidence ratio and a quench parameter;
    determining, based on the triple to double coincidence ratio and the quench parameter, a background reference parameter; and
    determining, based on the background reference parameter, the background count rate from a background reference curve.

2. The method according to claim 1, wherein the background reference curve is generated by:
    using a plurality of background samples having different quenches and performing the following steps for each background sample:
        measuring external standard spectra of the background sample;
        determining, from the external standard spectra, a triple to double coincidence ratio and a quench parameter;
        determining, based on the triple to double coincidence ratio and the quench parameter, a background reference parameter;
        measuring an energy spectrum of the background sample; and
        determining, from the energy spectrum, a background sample count rate within an energy window;
    plotting the background sample count rates against the background reference parameters; and
    fitting a curve to datapoints to obtain the background reference curve.

3. The method according to claim 2, wherein the background sample contains a liquid scintillation cocktail and a quench agent.

4. The method according to claim 2 wherein the number of background samples is at least 6.

5. The method according to claim 2, wherein a lower limit of the energy window is between 1 and 10 keV, and an upper limit of the energy window is between 30 and 75 keV.

6. The method according to claim 1, wherein the quench parameter is the spectral endpoint of the external standard spectrum.

7. The method according to claim 1, wherein the background reference parameter is calculated by an equation:

$$Ref = TDCR^a * QP^b,$$

where TDCR is the triple to double coincidence ratio, QP is the quench parameter, and a and b are weight parameters.

8. The method according to claim 1, wherein the background reference parameter is calculated by an equation:

$$Ref = TDCR^a * QP^b * Ecounts^c,$$

where TDCR is the triple to double coincidence ratio, QP is the quench parameter, Ecounts is an external standard count rate within an energy window, and a, b and c are weight parameters.

9. The method according to claim 1, wherein the sample contains carbon-14.

10. A method for determining a net sample count rate in liquid scintillation counting, comprising:
    measuring an energy spectrum of a sample;
    determining, from the energy spectrum, a gross sample count rate within an energy window;
wherein the method comprises:
    determining a background count rate according to claim 1; and
    subtracting the background count rate from the gross sample count rate to obtain the net sample count rate.

* * * * *